United States Patent [19]

Urabe

[11] Patent Number: 4,708,448
[45] Date of Patent: Nov. 24, 1987

[54] COLOR PICTURE REPRODUCTION WITH CUT-OFF BLUE SPECTRUM

[75] Inventor: Hitoshi Urabe, Kanagawa, Japan
[73] Assignee: Fuji Photo Film Co., Ltd., Kanagawa, Japan
[21] Appl. No.: 883,401
[22] Filed: Jul. 8, 1986
[30] Foreign Application Priority Data
Jul. 8, 1985 [JP] Japan .................................. 60-148192
[51] Int. Cl.⁴ ........................ G03B 29/00; G01D 9/42; H04N 5/84
[52] U.S. Cl. ...................................... 354/75; 346/1.1; 346/110 R; 358/244
[58] Field of Search ............... 354/75, 76; 346/110 R, 346/1.1; 358/302, 331–334, 244; 369/108; 313/467–469; 315/10

[56] References Cited
U.S. PATENT DOCUMENTS
3,693,178 9/1972 Braun et al. ..................... 346/110 X Primary Examiner—W. B. Perkey
Attorney, Agent, or Firm—Sughrue, Mion, Zinn, Macpeak & Seas

[57] ABSTRACT

Color print reproduction in which a monochromatic CRT with blue, green and red emissions successively displays a blue picture, a green picture and a red picture which are passed through blue, green and red filters respectively before exposing a color print material. At least the blue picture is also passed through a yellow filter in order to suppress the blue response of the green and red layers of the print material.

4 Claims, 6 Drawing Figures

4,708,448

COLOR PICTURE REPRODUCTION WITH CUT-OFF BLUE SPECTRUM

BACKGROUND OF THE INVENTION

1. Related Application

This application is related to Japanese Patent Application No. 148,193/85, upon which is based U.S. Patent Application Ser. No. 883,397, filed July 8, 1986.

2. Field of the Invention

The present invention relates generally to a color picture reproducing method. More particularly, it relates to a color picture reproducing method in which a color photosensitive material is exposed to light form tricolor-decomposed pictures displayed on a high-luminance monochromatic cathode-ray tube (CRT) successively scene by scene.

3. Background Art

It has been recent practice to record pictures on magnetic recording media, such as a magnetic disk, by using electronic cameras (for still pictures). Alternatively, pictures are photographed once on color photographic films by using ordinary cameras and are then recorded on magnetic recording media such as a magnetic disk, so that the pictures recorded on the magnetic media can be reproduced or displayed on CRTs for viewing. With the advance of such recording techniques, it has been suggested that color pictures recorded on magnetic disks can be printed onto color photosensitive materials as color prints to be handed over to customers.

As one conventional method for reproducing such color prints, that is, color pictures, a method shown in FIG. 1 has been used in practice.

As shown in the drawing, the conventional method is carried out such that a high-luminance monochromatic CRT 1, whose monochromatic output has luminance in the blue (B), green (G) and red (R) regions is caused to emit light successively on the basis of blue, green and red picture signals obtained by decomposing a picture into its three color components. A color photosensitive material 4 is exposed successively to the emitted light on the basis of the respective blue, green and blue picture signals (that is, scene by scene exposure) through a lens system 2 and respective blue, green and red filters 3. The blue, green and red filters are each successively used for the exposure of the pictures corresponding to the blue, green and red picture signals. Then, the color photosensitive material 4 is developed to obtain a color print.

In the above-mentioned printing method, however, it is impossible to avoid color mixing owing to the fact that not only a blue (B) photosensitive layer but also a green (G) photosensitive layer and/or a red (R) photosensitive layer are sensitized in the exposure for the blue (B) photosensitive layer, resulting in a problem of reduction in saturation particularly in the blue area.

SUMMARY OF THE INVENTION

An object of the present invention is therefore to provide a color picture reproducing method in which it is possible to prevent erroneous sensitization of the green photosensitive layer and/or the red photosensitive layer when the blue photosensitive layer is exposed, to thereby prevent or suppress the occurrence of color mixing caused by such an erroneous sensitization.

In order to attain the foregoing object, the method of the present invention reproduces a color picture in the following steps. A monochromatic CRT having a spectrum with luminance in the blue (B), green (G) and red (R) regions emits light on the basis of a B signal, a G signal, and an R signal successively, one scene at a time to successively obtain a B picture, a G picture, and an R picture on the CRT. A color photosensitive material is successively exposed to light of the blue picture, the green picture, and the red picture through a blue filter, a green filter, and a red filter respectively. According to the invention, the exposure by the blue picture is performed in a wavelength area free from a peak of wavelength of intrinsic sensitivity of silver halide of the color photosensitive material.

DESCRIPTION OF THE PREFERRED EMBODIMENTS

A preferred embodiment according to the present invention will be described hereinunder more in detail with reference to the drawings.

Figure 1:
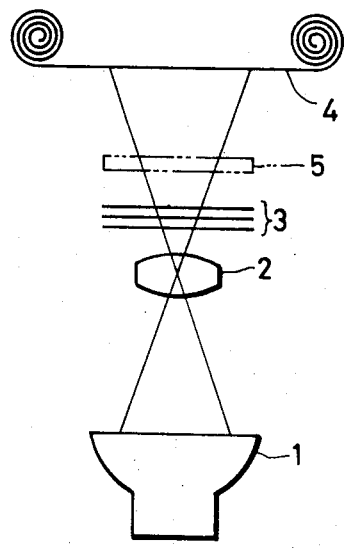
FIG. 1 is a schematic view showing an embodiment of the present invention.
Figure 2:
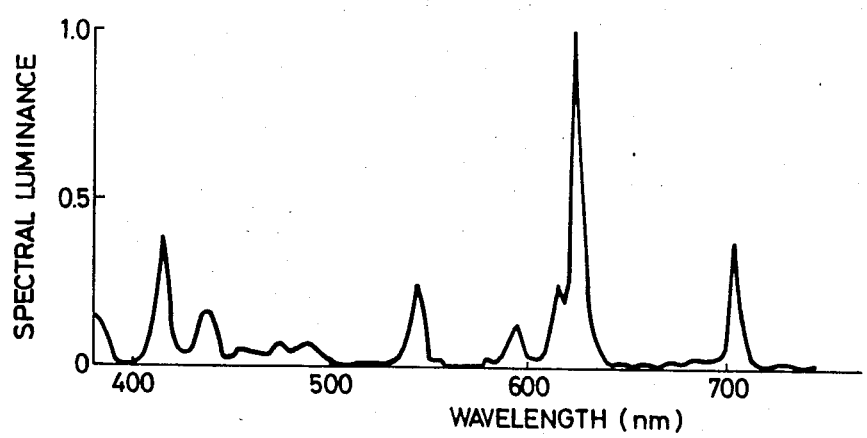
FIGS. 2 and 3 are graphs showing an example of spectral luminance of fluorescent substances used in the present invention.
Figure 3:
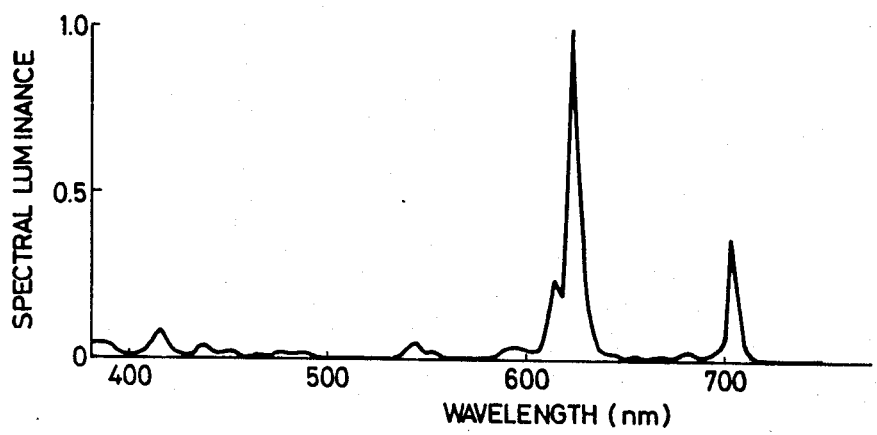

A high-luminance CRT 1 is used for exposure. In FIG. 1, the high-luminance CRT 1 has emission luminance in the red green and blue, examples of which are shown in FIGS. 2 and 3. A fluorescent substance used in the CRT 1 may be a mixture of fluorescent material named P-45 and P-22, P-45 having a luminance distribution in a wavelength area shorter than about 600 nm, P-22 having a luminance distribution in a wavelength area longer than about 600 nm. FIG. 2 shows an example of the fluorescent substance containing P-45 and P-22 mixed in the equivalent proportion, and FIG. 3 shows another example of the fluorescent substance containing P-45 and P-22 mixed in the proportion 1:4. It is apparent from the drawings that these fluorescent substances have spectral sensitivity distributions such that the blue (B) luminance and luminance peak are in a wavelength region from about 360 nm to 480 nm, the green (G) luminance and luminance peak are in a wavelength region from about 540 nm to 555 nm, and the red luminance and luminance peak are in a wavelength region from about 620 nm to 640 nm ($R_1$, primary peak region) and in a wavelength region from about 700 nm to 710 nm ($R_2$, secondary peak region).

A picture signal is decomposed into three color components, that is, blue, green and red (B, G and R) picture signals, which are in turn recorded on a magnetic disk (or a floppy disk) separately from each other. The blue, green and red picture signals separately read out of the magnetic disk or the like are successively transferred to the CRT 1 so that the CRT 1 emits light successively scene by scene in response to the received blue, green and red picture signals.

The light emitted from the respective pictures successively displayed on the CRT 1 is successively passed through a lens 2 and a filter 3 so as to be projected onto a color photosensitive material 4 with an equisized scale, an enlarged scale, or a reduced scale to thereby expose the color photosensitive material 4 by the light.

Figure 4:
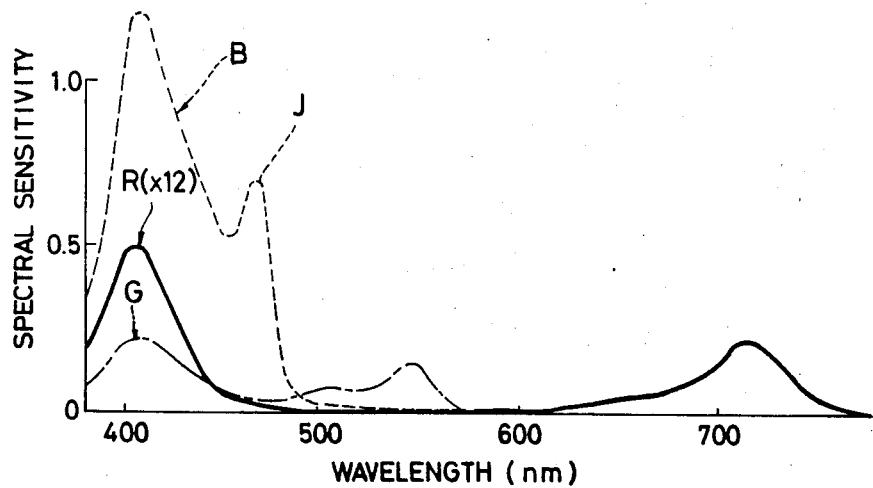
FIGS. 4 and 5 are graphs showing spectral sensitivity of color photosensitive materials used in the present invention.
Figure 5:
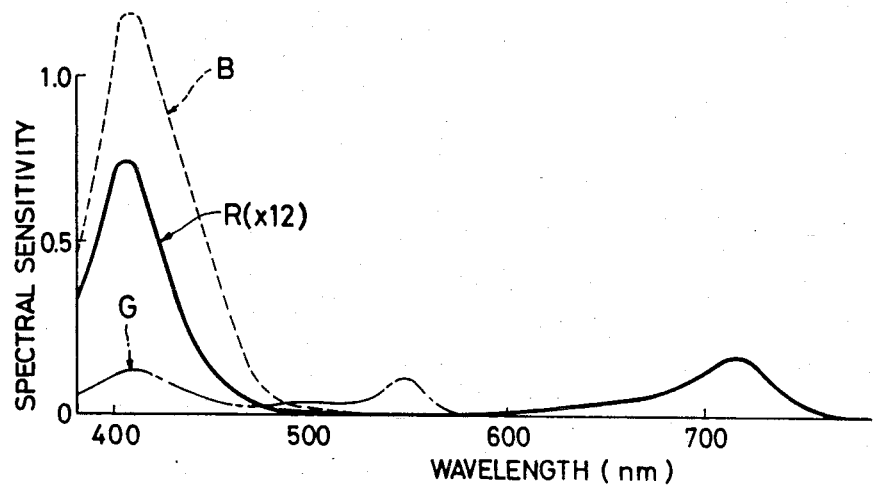

FIGS. 4 and 5 shows the spectral sensitivity of two color photo-sensitive materials (color paper) used in the present invention. (In the drawings, the spectral sensitivity in the red (R) is shown with a value enlarged 12 times for the clearness of the drawings.) Each color photosensitive material has spectral sesitivity such that its blue (B) photosensitive layer thereof has greatest sensitivity in the blue wavelength region (ranging from about 360 nm to about 480 nm) of the CRT, its green (G) photosensitive layer has significant sensitivity in the green wavelength region (ranging from about 460 nm to about 555 nm) of the CRT, and its red (R) photosensitive layer has some sensitivity in the secondary peak region (ranging from about 700 nm to about 710 nm) of the red wavelength region of the CRT. However, each of the blue (B) photosensitive layer, the green (G) photosensitive layer and the red (R) photosensitive layers has a peak of spectral sensitivity in the same region at about 410 nm on the basis of the intrinsic sensitivity of silver halide.

On the other hand, a blue filter which transmits only light in the blue wavelength region is used for the exposure to a blue picture. A green filter which transmits only light in the green wavelength region is used for the exposure to a green picture. And a red filter which transmits only light in the red wavelength region (including the infrared area) is used for the exposure to a red picture. The blue, green and red filters used as the filters 3 for the purpose as described above have characteristics as shown in FIG. 6.

Figure 6:
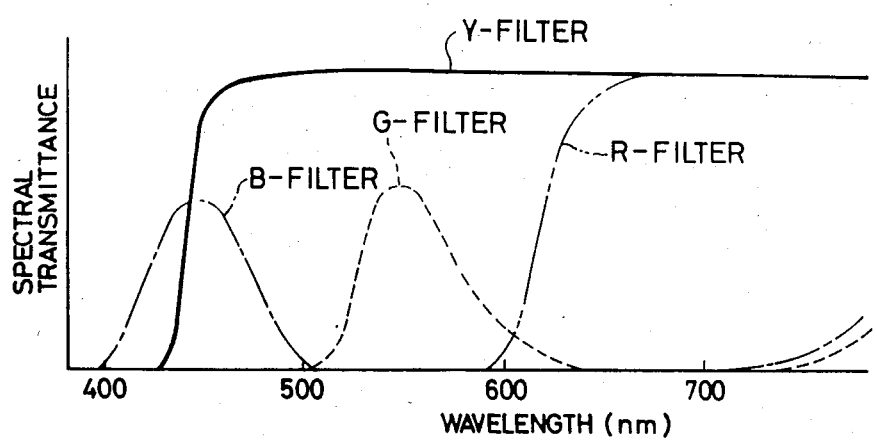
FIG. 6 is a graph showing spectral transmittance of B, G, R and Y filters used in the present invention.

Accordingly, the exposure to a blue picture performed only through the blue filter of such a characteristic as shown in FIG. 6 is almost equivalent to an exposure performed by light of a single wavelength of the blue luminous peak (about 410 nm) of the respective fluorescent substance shown in FIGS. 2 and 3. When the exposure to a blue picture is made by light of such a single wavelength of about 410 nm, the relative sensitivities of the blue (B) layer, green (G) layer and red (R) layer are R:G:B=120:22:4 (the logarithmic ratios are 2.08:1.34:0.6). Accordingly, the difference in sensitivity between the blue (B) layer and the green (G) layer by the light at the wavelength of 410 nm is (2.08−1.34=) 0.64. Assuming that the gamma value and reproduction concentration range of the color photosensitive material are both 2, the green (G) layer becomes colored when the concentration in blue is equal to or higher than (0.64×2=) 1.28, resulting in color mixing. Similarly, in the case where such a color photosensitive material as shown in FIG. 5 is used, the sensitivity ratios of the blue (B) layer, the green (G) layer, and the red (R) layer are B:G:R=120:15:6.5 (logarithmic ratios being 2.08:1.18:0.81). Accordingly, the difference in sensitivity between the blue layer and the green layer at the wavelength of 410 nm is (2.08−1.18=) 0.9, and when the gamma value and reproduction concentration range of the color photosensitive material are the same value, the green layer becomes colored when the blue concentration is equal to or higher than (0.9×2=) 1.8, resulting in color mixing.

In FIG. 1, a yellow (Y) filter 5 is used when a blue picture is exposed for the purpose of removing the above-mentioned defect. For example, the yellow filter 5 has spectral transmittance as shown in FIG. 6, thereby cutting through the peaks of the intrinsic wavelength sensitivity of silver halide. Although it is sufficient to use the yellow filter 5 only when a blue picture is exposed, the yellow filter 5 may be allowed to remain in the exposure of the green (G) and the red (R) picture, because, generally, the yellow filler 5 has such a transmitting characteristic in the green and red regions, as shown in FIG. 6. Accordingly, the yellow filter 5 may be established as a fixed filter.

When the exposure to a blue picture is performed onto the color photosensitive material shown in FIG. 4 by a light of the wavelength of 470 nm with insertion of the yellow filler in the light path, the sensitivity ratios of the blue (B) layer, the green (G) layer and the red (R) layer becomes such that B:G:R=70:4:0.2 (logarithmic ratios being 1.85:0.6:-0.7). Accordingly, the difference in sensitivity between the blue layer and the green layer is (1.85−0.6=) 1.25. Accordingly, the green layer is not colored unless the concentration in blue becomes equal to or higher than 2.5 under the same condition as described above. Accordingly, color mixing never arises under the condition that the reproduction concentration range is 2.0. Similarly to this, when the exposure to a blue picture is performed onto the color photosensitive material as shown in FIG. 5 by light of the wavelength of 450 nm, the sensitivity ratios of the blue layer, the green layer and the red layer are B:G:R=48:3:1 (logarithmic ratios being 1.68:0.48:0). Accordingly, the difference in sensitivity between the blue layer and the green layer is (1.68−0.48=) 1.2. Accordingly, the green layer is not colored unless the concentration in blue is equal to or higher than 2:4 under the same condition as described above. Accordingly, color mixing never arises under the condition that the reproduction concentration range is 2.0, as described above.

As described above, according to the present invention, it is possible to perform exposure to a blue picture by light in a wavelength region free from a peak of wavelength of intrinsic sensitivity of silver halide of the color photosensitive material. Accordingly, it is possible to prevent sensitization of the green photosensitive layer and the red photosensitive layer in the exposure to a blue picture. More particularly, the occurrence of color mixing caused by the foregoing sensitization is reduced or eliminated.

Furthermore, in a color photosensitive material in which the blue (B) layer has a peak region of spectral sensitivity called J-band, represented by J in FIG. 4, it is possible to prevent the occurrence of color mixing more effectively as long as the J-band region is suitably sensitized.

What is claimed is:

1. A method of reproducing a color picture comprising the steps of:
   causing a monochromatic CRT having luminance in a blue, a green and a red region to successively emit light on the basis of a blue signal, a green signal, and a red signal for a scene to successively obtain a blue picture, a green picture, and red picture; and
   exposing a color photosensitive material successively to light of said blue picture, said green picture, and said red picture through a blue filter, a green filter and red filter respectively;
   wherein, the exposure by the light of said blue picture is performed in a wavelength region in which a peak of sensitivity to said blue light of a silver halide in said photosensitive material is cut-off in wavelength.

2. A method as recited in claim 1, wherein said step of exposing said color photosensitive material to said blue picture includes passing said blue picture through a color filter having a different transmission characteristic than said blue filter.

3. A method as recited in claim 2, wherein said color filter is a yellow filter.

4. A method as recited in claim 3, wherein said steps of exposing said color photosensitive material to said green and red picture include passing said green and red pictures through said yellow filter.

* * * * *